United States Patent

[11] 3,542,110

| [72] | Inventor | William L. Holl<br>Gadsden, Alabama |
|---|---|---|
| [21] | Appl. No. | 717,543 |
| [22] | Filed | April 1, 1968 |
| [45] | Patented | Nov. 24, 1970 |
| [73] | Assignee | The Goodyear Tire & Rubber Company<br>Akron, Ohio<br>a corporation of Ohio |

[54] VALVE MEANS FOR MULTI-CHAMBER PNEUMATIC TIRE
7 Claims, 3 Drawing Figs.

[52] U.S. Cl. .................................................. 152/429
[51] Int. Cl. .................................................. B60c 23/10
[50] Field of Search.................................... 152/339,
340, 341, 342, 415; 137/223, 234.5

[56] References Cited
UNITED STATES PATENTS

| 837,458 | 12/1906 | Fairchild .................... | 152/340 |
| 2,272,548 | 2/1942 | Creamer...................... | 152/342 |
| 3,421,535 | 1/1969 | Hawkes et al................ | 152/341 |

FOREIGN PATENTS

| 162,059 | 3/1955 | Australia...................... | 152/341 |

Primary Examiner—James B. Marbert
Attorneys—F. W. Brunner and M. William Goodwin ABSTRACT: A valve assembly for use with a dual chambered tire which permits location of a dual valve in a position remote from the usual mounting position of such a valve and in an angular relationship to the tire rotational axis to permit assembly with a wheel while not interfering with adjacent components such as a disc brake assembly. The valve is mounted on a pair of bendable tubular members dispersed one within the other which provide a pair of air passages between the valve and the chambers of the tire.

INVENTOR.
WILLIAM L. HOLL
BY M William Jordan
ATTORNEY

Patented Nov. 24, 1970

INVENTOR.
WILLIAM L. HOLL
BY M William Goodwin
ATTORNEY

VALVE MEANS FOR MULTI-CHAMBER PNEUMATIC TIRE

This invention relates to a multichamber tire and valve means therefor, and more particularly to a novel and improved arrangement for providing communication between the valve means and the chambers of the tire.

In certain installations of multichamber pneumatic tires, and more particularly safety tires such as of the type shown in U.S. Pat. Nos. 3,225,811 or 3,361,153, it has become desirable to locate the valve means which control the flow of air into and out of the chambers of the tire in a position remote from the tire and in some cases with the valve means being displaced angularly from the conventional orientation of such valve means as shown in the aforementioned patents.

Accordingly, it is the primary object of the present invention to provide novel and improved means for connecting the valve means with the chambers in a tire of the type described which will permit the valve means to be located substantially remotely from the tire, and, as necessary, in an angular position with respect to the tire axis different from the usual position of such valve means in conventional installations.

Other objects will be in part obvious, and in part pointed out more in detail hereinafter.

Figures 1, 2:
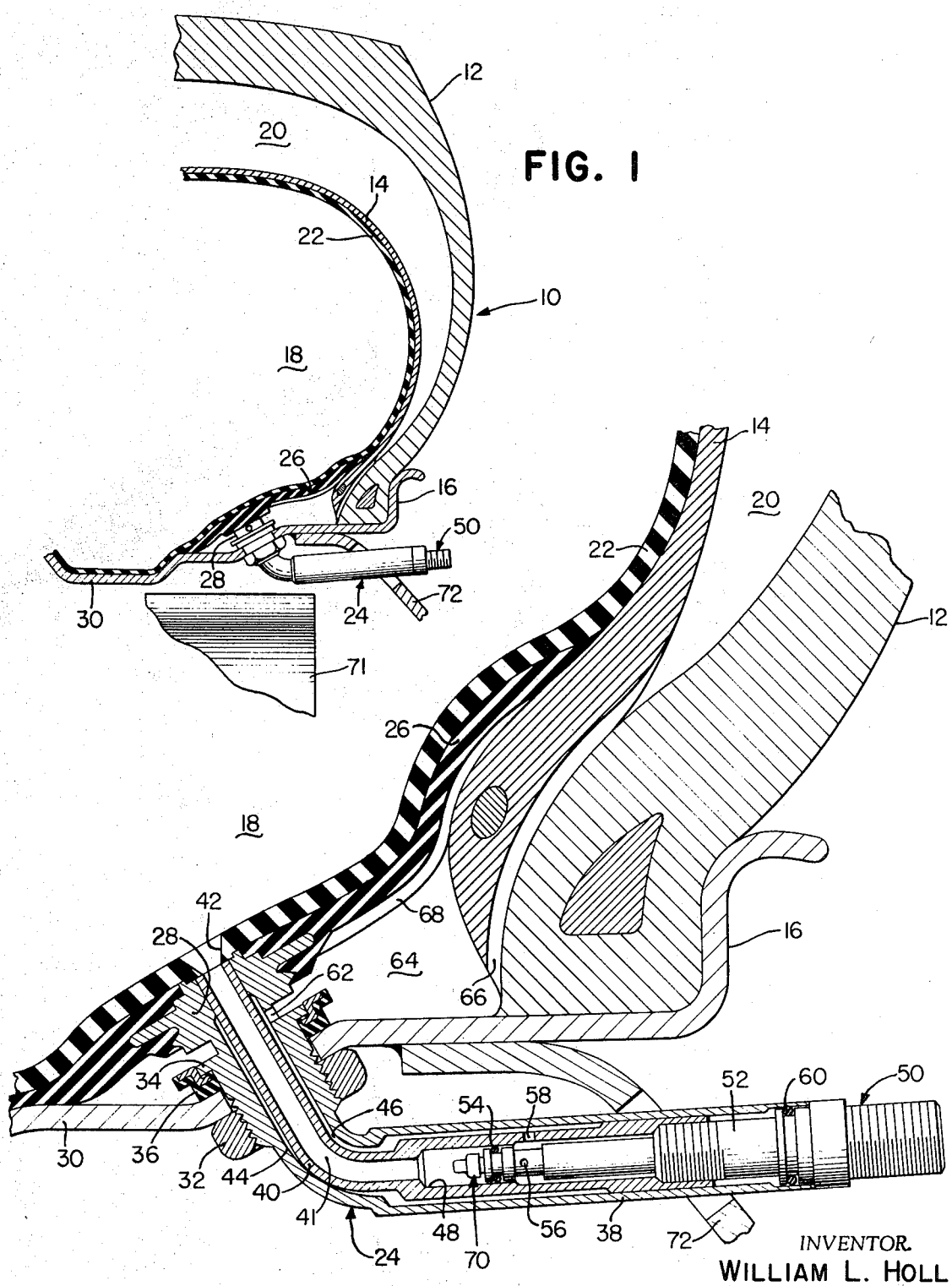
FIG. 1 is a fragmentary, cross-sectional view of a tire and wheel combination incorporating a valve assembly constructed in accordance with this invention.
FIG. 2 is an enlarged fragmentary, longitudinal cross-sectional view of the valve assembly of FIG. 1.

With reference to the drawings and particularly FIGS. 1 and 2, the valve assembly of this invention is shown in combination with a multichamber tire 10 which includes an outer tire 12 and an inner tire 14. The outer tire 12 is mounted on a drop center wheel 16. The inner and outer tires 12 and 14 define an inner air chamber 18 and an outer air chamber 20. The inner tire 14 includes a tube 22 which assures the airtight integrity of the inner chamber 18 and to which is connected the valve assembly generally indicated at 24.

With particular reference to FIG. 2 the valve assembly 24 comprises a rubber base portion which may be, as is conventional, vulcanized to the tube or air container 22. carried by the base 26 is a bushing 28, one end of which is embedded within the base 26. The other or outer end of the bushing 28 projects through, as is conventional, a suitable opening in the rim 30 of the wheel 16 on which the tire is mounted. The outer end of the bushing 28 is externally threaded, and a retaining nut 32 is threadably engaged therewith. The bushing 28 is provided intermediate its ends with a radially outwardly extending annular shoulder 34 facing toward the outer end of the bushing. A rubber covered washer 36 is engaged between the shoulder 34 and the rim with the retaining nut 32 serving to clamp the washer between the shoulder 34 and rim 30 to provide an airtight seal at this point.

In accordance with the present invention, the bushing 28 terminates at its outer end in an elongated tubular member 38. In the specific embodiment shown, the tubular member 38 is formed integrally with the bushing 28, although, of course, it will be apparent that these two parts could initially be separate and then later joined in coaxial relation in any suitable manner. Disposed within the tubular member 38 is an inner, elongated second tubular member 40 providing an inner passage 41. The inner end of the inner tubular member 40 is engaged within an opening at the inner end of the bushing 28 in registry with an opening 42 in the tube 22. The bushing is provided with a counterbore 44 having a diameter which corresponds to the inner diameter of the outer tubular member 38. The counterbore 44 is, of course, of greater diameter than the outer diameter of the inner member 40, and the inner diameter of the outer tube 38 is greater than the outer diameter of the inner tube 40, so as to provide a generally annular outer air passage 46 between the outer wall of the inner tubular member 40 on one hand and the inner wall of the outer tube 38 and the counterbore 44 on the other hand.

The inner tubular member 40 is enlarged at its outer end to provide an outer body portion for dual valve means 50 received with a stepped counterbore 48 in said body portion. The dual valve means 50 has a valve core housing 52 which intermediate its ends is threadably received and engaged in airtight relation within the body portion formed by the outer end of the inner tubular member 40. The dual valve 50 may be of any suitable construction, for example, such as is shown in the aforementioned U.S. Pat. No. 3,361,153. As will be seen from FIG. 2, the inner wall of the inner tubular member 40 is spaced from the valve core housing 52 in a manner similar to the usual valve stem to form the outer end portion of the air passage 46. A seal 54 adjacent and about the inner end portion of the valve core housing provides a seal between the housing and the inner wall of the inner tubular member 40. Between the seal 54 and the threaded engagement between the valve core housing and inner tubular member 40, the valve core housing is provided with an outlet opening 56 which opens into the space between the valve core housing and inner tubular member 40. The inner tubular member 40 is provided with an opening 58 extending through the wall thereof and generally adjacent the opening 56 in the valve core housing, so as to provide for air flow communication from the outlet port 56 in the valve core housing to the space 46 between the inner and outer tubular members.

The passage 46 is at least substantially closed at its outer end by engagement between the inner wall of the outer tubular member 38 and an enlarged portion at the outer end of the inner tubular member 40. In addition, a seal 60 is provided between the inner wall of the outer tubular member 38 and the valve core housing 50 adjacent the outer end of the outer tubular member 38, so as to assure sealing of the passage 46 from the atmosphere. The inner end of the passage 46 terminates within the bushing 28 adjacent an opening 62 in the bushing which communicates at one end with the passage 46 and at its other end with a space 64 between the base 26 and the rim 30. The inner tire 14 is provided with a plurality of grooves 66 along the exterior of the bead and lower sidewall region of the inner tire, as is conventional, in order to provide for the passage of air from the chamber 64 and into the outer chamber 20 of the tire. The base 26 is provided with grooves 68 on its underside in order to assure that even if the base is deformed so as to engage the rim there will still be a free passage of air from the opening 62 in the bushing into the outer chamber 20 of the tire.

As previously mentioned, the valve core housing 52 is threadably engaged within the interior of the inner tubular member 40. As is conventional, the valve 50 is provided with a second outlet passage at its inner end portion, generally at 70. Thus, the second outlet passage is in communication with the interior of the inner tubular member 40, the inner end of which is in free communication with the inner chamber 18 of the tire through an opening 42 in the tube 22. As is well known, the valve 50 is selectively operable to provide for flow of pressurized air either through the outlet passage 58 or both the outlet passage 58 and the second outlet passage of the valve.

In accordance with the present invention, the tubular members 38 and 40 are fabricated of a material, for example, but not limited to, brass, which will permit bending of the tubes without fracture after the tubes have been assembled one within the other. In other words, the tubular members 38 and 40 are initially provided in a straight configuration, and subsequent to assembly thereof with the bushing 28, the tubes are bent at a location intermediate their ends so that the outer end portions of the tubular members extend angularly of the inner end portions thereof and thus angularly of the bushing 28. During this bending of the tubular member there is some tendency for the inner tubular member and outer tubular member to move closer together, particularly at the outside of the bend. However, sufficient space is initially provided between the tubes due to their difference in diameters so that the passage 46 remains continuous and open over its full length, even though perhaps not continuously in a direction circumferentially about the tubular members in the area of the apex of the bend. In this connection, it will be noted that the outer tubular member is reduced in outer diameter at least over the area of the bend so as to reduce the tendency of the outer tube to radially collapse. Also, this stepdown or reduction in the outer diameter of the outer tube tends to reduce the bulging of this tube at its sides as it is bent and thus prevent interference with removal of the retaining nut 32 after the tube has been bent. In this connection it will be understood that the nut 32 is threaded onto the bushing 28 before the tubular members are bent. Further, it will be noted that the outer diameter of the outer tube 38 over the bent portion thereof is substantially less than the outer diameter of the threaded portion of the bushing, and thus less than the inner diameter of the retaining nut 32. Accordingly, it is possible after the tubular members have been bent to unthread the retaining nut 32 from the bushing and move it down over the bent portion of the tubular members and remove the nut from the assembly. It will be apparent from FIG. 2 that it is necessary to remove the nut from the assembly in order to permit the valve assembly to be inserted through the opening in the rim which receives the bushing 28.

As noted above, the inner and outer tubular members are assembled while they are initially in a straight configuration and are thereafter bent to the configuration shown in FIG. 2. As will be further apparent from FIG. 2, the diameters of the tubular members 38, 40 and the lengths of the straight portions extending from the bent portions of the members are related dimensionally such that it will not be possible to disassemble the tubular members once these members have been bent. The inner ends of the inner and outer tubular members 38 and 40 are fixed relative to the bushing 28; however, the outer ends of these members are not fixed relative to each other so as to facilitate bending of the tubes. After the tubes have been bent, it will be apparent that the outer ends of the tubular members which cooperate with the valve means 50 extend at a substantial angle to the longitudinal axis of the bushing or fitting 28 for mounting the same on a rim. It will also be apparent that the outer ends of the tubes and thus the valve means 50, extend generally parallel to the axis of rotation of the tire, thus eliminating adverse effects of centrifugal force on the valve means during high speed operation of the tire. In the specific embodiment shown in FIG. 1, the angular relationship of the valve means 50 and the fitting 28 permits the valve to clear, for example, a disc brake assembly 71 and extend through a generally radially extending disc 72 which supports the rim on the wheel hub.

Figure 3:
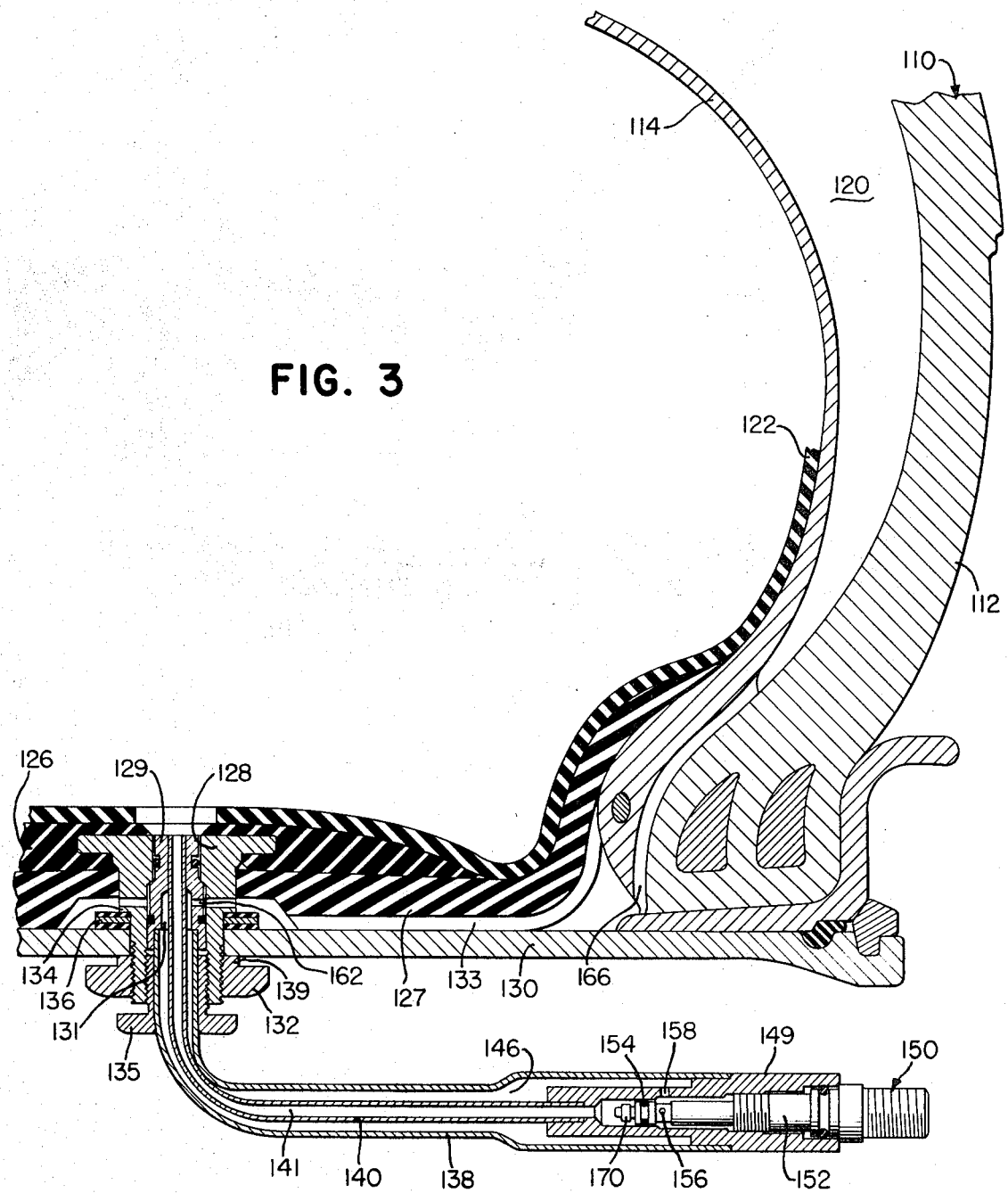
FIG. 3 is a fragmentary, cross-sectional view of a tire and wheel assembly differing in type from that shown in FIG. 1 and incorporating an alternative construction for a valve assembly of this invention.

With reference to FIG. 3 there is shown an alternative embodiment of the present invention, which is used in conjunction with a truck tire mounted on a sealed rim; the embodiment of FIGS. 1 and 2 being shown in connection with a passenger car tire. Of course, it is to be understood that neither of the embodiments are limited to use with the specific truck or passenger tire installations with which they are shown. In the embodiment of FIG. 3, the tire is generally similar to the tire of the previously described embodiment comprising an outer tire 112, an inner tire 114, and an air retaining tube 122 disposed within the inner tire 114. The tire 110 is mounted on a wheel assembly comprising a sealed rim 130 on which is mounted a fitting or bushing 128 which extends through an opening in the rim 130 and is retained thereon by a retaining nut 132. The bushing 128 is embedded at its inner end in a base portion or member 126, which is fixed to the tube 122. Disposed between the base and the rim is a flap 127 which serves to protect the tube from the rim. Received within the inner end of the bushing 128 is a sleeve 129 having a bore at its inner end within which is sealingly engaged an elongated tubular member 140. The tubular member 140 is received in spaced relation within an outer tubular member 138, one end of which is sealingly engaged within a counterbore in the outer end of the sleeve 129. The sleeve 129 is provided with an intermediate counterbore between the end of the tube 138 and the bore receiving the tube 140. The sleeve 129 is provided with an opening 162 in the wall thereof, which provides communication between the intermediate counterbore 131 and the underside of the flap 127, which is provided with grooves 133 for the passage of air into the outer chamber 120 of the tire through grooves 166 on the external sidewall and bead region of the inner tire 114.

The sleeve 129 is retained within the bushing 128 by a threaded retaining sleeve 135, threadably engaged within the retaining nut 132 and surrounding and receiving the outer tubular member 138. In order to provide a seal about the bushing 128 a rubber covered washer 136 is clamped between an annular radially extending shoulder 134 on the bushing 128 and the interior surface of the rim 130. The bushing 128 is centered or piloted on the rim by engagement of the outer wall of the bushing with the wall of the hole in the rim in which the bushing is received. However, it will be further noted that the retaining nut 132 is provided with a reduced cross section cylindrical portion or boss 139 on the side thereof facing the rim 130. The reduced portion 139 has an outer diameter substantially greater than the outer diameter of the pilot portion of the bushing 128 so that when the assembly is used with a rim having a bushing receiving hole of larger diameter the reduced portion 139 on the retaining nut 132 may be used as a pilot to center the bushing in the rim hole. In this connection the washer 136 has an outer diameter substantially greater than the diameter of the boss 139.

The outer tubular member 138 is at its outer end mounted on an outer body 149 which receives valve means 150 generally similar to the valve means 50 previously described. The outer end of the tube 138 is sealed to the body 149 and with the body 149 and outer surface of the inner tubular member 140 defines a generally annular air passage 146 leading to the opening 162 in the bushing 129. The outer end of the inner tubular member 140 is received within a bore at the inner end of the body 149 and communicates with an outlet port located generally at 170 on valve means 150. The valve means 150 is provided with another outlet port 156 which through an opening 158 in the body 149 communicates with the outer passage 146. The outlet ports of the valve means 150 are sealed from each other by means of a seal 154 disposed between the valve core housing 152 and the outer body 149.

In the embodiment of FIG. 3 the tubular members are fabricated of a material permitting these members to be bent as shown in FIG. 3 so that the valve means 150 extends at a substantial angle relative to the bushing 129. The bending of the tubular members and the length thereof permits the valve means 150 to be located remotely from but adjacent the outside of the tire and wheel assembly for ready access and also enables the valve means to be positioned generally parallel to the rotational axis of the tire to avoid adverse effects of centrifugal force during high speed rotation of the tire. During bending of the tubes 138, 140 there will be some collapsing of the outer tube, however, this collapsing is insufficient to completely close the outer passage 146 or the inner passage 141 provided by the inner tubular member 140.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim:
1. In the combination of a tire having a pair of air chambers; valve means disposed remotely from the tire and including a housing having a pair of outlet passages for communication respectively with said pair of air chambers, a pair of elongated tubular members extending between the tire and valve means and arranged one within the other in radially spaced relation to provide a pair of air passages respectively communicating at one end with said pair of outlet passages and at the other end respectively communicating with said pair of chambers, and means sealing said air passages one from the other.

2. In the combination described in claim 1, a fitting adapted to be carried by the tire and adapted to be mounted on a rim, one end of said tubular members being mounted on said fitting, and means on said fitting providing openings therein for communication of said pair of air passages with said pair of air chambers.

3. In the combination described in claim 2, said tubular members being bent intermediate said fitting and said valve means, whereby said valve means extends at a substantial angle relative to the longitudinal axis of said fitting.

4. In the combination described in claim 3, said fitting and said outer tubular member being of one piece construction and said outer tubular member being reduced in outer diameter over the bent portion thereof.

5. In the combination described in claim 1, means for mounting said tubular members on a wheel rim comprising a fitting adapted to extend through a mounting hole in a rim and having an outer cylindrical surface adapted to act as a pilot in such a hole, and a retaining nut threadably engaged over one end of said fitting, said retaining nut having a cylindrical boss disposed coaxially of said fitting and extending inwardly thereof and having an outer cylindrical surface substantially larger than the pilot surface on said fitting to provide a secondary pilot surface when said fitting is mounted in a hole of larger dimension than the pilot surface on said fitting.

6. In the combination described in claim 2, the outer end portion of the outer tubular member being enlarged, said housing being received at least in part within a tubular portion extending from the outer end of the inner tubular member and said tubular portion being disposed within the outer end portion of said outer tubular member in radially spaced relation over at least a portion of the length thereof to form a continuation of the outer passage of said pair of air passages, said housing having a first outlet passage communicating through an opening in said tubular portion with said outer passage and having a second outlet passage which communicates with the interior of said inner tubular member, and means sealing said outlet openings one from the other.

7. In the combination described in claim 6, said fitting being a tubular member within which the inner ends of said inner and outer tubular members are coaxially received, the inner tubular member opening outwardly of one end of said fitting and otherwise being sealed relative to said fitting, the inner end of said outer member terminating short of said one end of said fitting, and means intermediate said one end of said fitting and said inner end of said outer tubular member providing an outlet in the wall of said fitting and in communication with the inner end of said outer passage.

UNITED STATES PATENT OFFICE
CERTIFICATE OF CORRECTION

Patent No. 3,542,110                Dated November 24, 1970

Inventor(s) William L Holl

It is certified that error appears in the above-identified patent and that said Letters Patent are hereby corrected as shown below:

On the first printed page of the patent and immediately following the Abstract of the Disclosure insert:

"The foregoing abstract is not to be taken as limiting the invention of this application, and in order to understand the application, reference must be made to the accompanying drawings and the following detailed description."

Signed and sealed this 8th day of June 1971.

(SEAL)
Attest:

EDWARD M. FLETCHER, JR.           WILLIAM E. SCHUYLER, JR.
Attesting Officer                       Commissioner of Patents